Jan. 11, 1955
A. W. WHITAKER
2,699,302
UNDERCARRIAGE FOR AIRPLANES
Filed Sept. 13, 1952
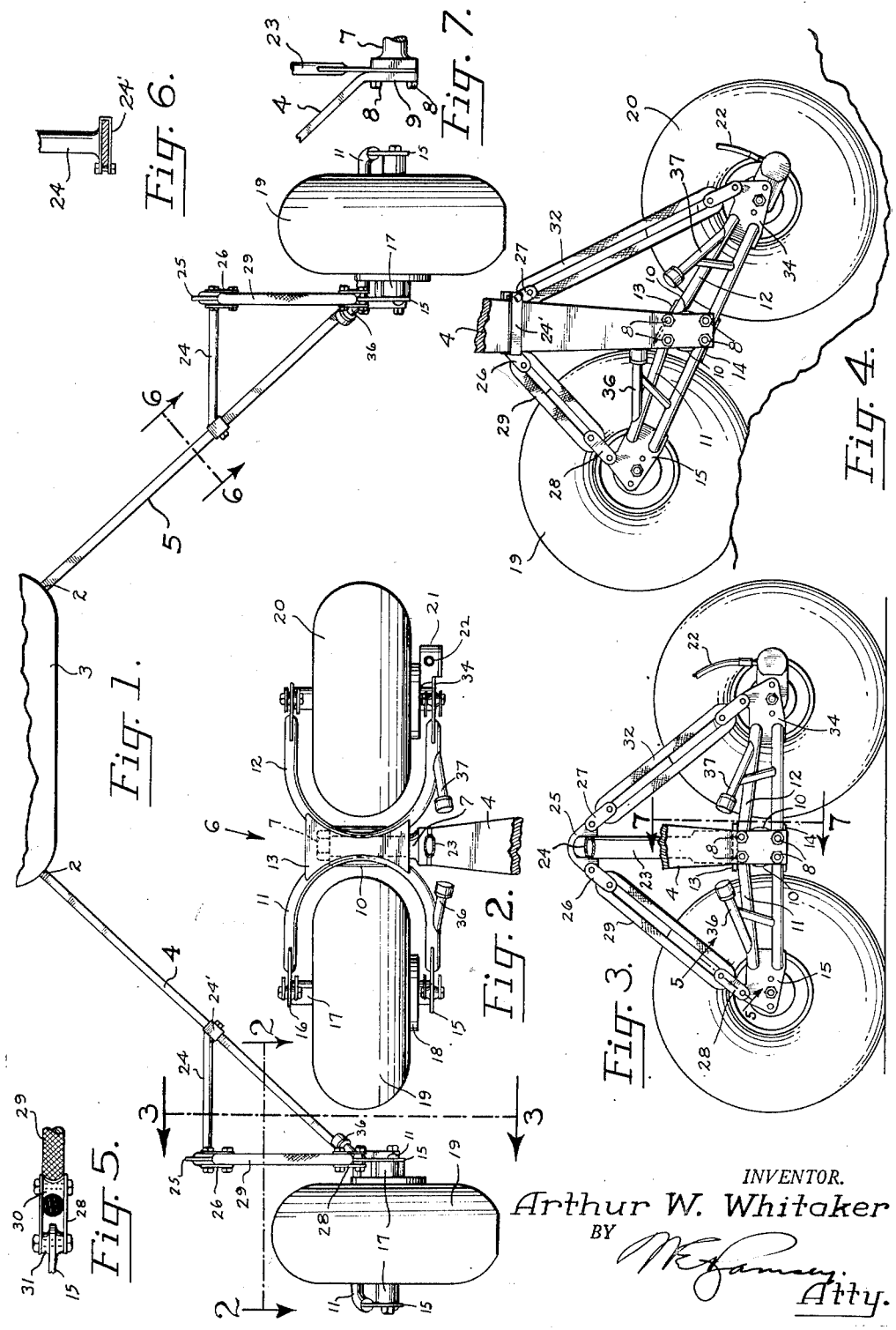
INVENTOR.
Arthur W. Whitaker
BY
Atty.

United States Patent Office 2,699,302
Patented Jan. 11, 1955

2,699,302

UNDERCARRIAGE FOR AIRPLANES

Arthur W. Whitaker, Vancouver, Wash.

Application September 13, 1952, Serial No. 309,431

5 Claims. (Cl. 244—103)

This invention has to do with the landing undercarriage for an airplane, and particularly an undercarriage having two pivoted wheel supporting frames in which the wheels are supported in tandem.

There are many conditions under which airplanes are called upon to land or take off from a rough field, soft sand, flooded or otherwise unsuitable ground. This is particularly true for certain types of airplanes such as used in rescue work or those carrying on agricultural dusting operations. It has been known that a multi-wheel type undercarriage will give a plane greater stability and permit it to take off or land on such terrain. However, according to the suggestions heretofore made, the undercarriage was a complicated construction involving springs, shock absorbers, ball joints, etc. Such construction was not only expensive, but also added considerably to the weight of the undercarriage, which is a critical factor in determining the size of the field necessary for landing and taking off. Furthermore, such carriages did not lend themselves to ready maintenance and were not adapted for quick installation to the usual aircraft fuselage.

The undercarriage which is the subject of the present invention is the result of extensive experimentation and while it was developed specifically to meet the problems arising in connection with aircraft dusting of agricultural fields and the like and has there proved to be eminently satisfactory, the undercarriage has many other uses and is obviously not limited to airplanes used in such operations.

According to the invention, there is substituted in place of the usual single landing wheel on either side of the plane beneath the pilot, a pair of wheels for each side mounted in tandem in a rigid supporting frame which is pivotally connected to a strut from the airplane fuselage. A pair of resilient bands or cables are connected between the strut and either side of the pivot point in the frame. Stop means for preventing the frame from rotating beyond its critical limits are also provided.

The tandem wheels, by increasing the contact area between the airplane and ground, function in effect like a pair of short pivoted skids. Thus for instance it has been found possible safely to land a plane equipped with the undercarriage according to this invention on ground covered either with water or snow to a depth approaching the diameter of the wheel or on a field having holes or ditches or ruts of similar depth.

The invention will not be described in greater detail with reference to the drawings in which:

Fig. 1 is a front elevation of the undercarriage;
Fig. 2 is a top plan view on the line 2—2 of Fig. 1;
Fig. 3 is a side elevation on the line 3—3 of Fig. 1;
Fig. 4 is the same view as Fig. 3 with the wheels going over an irregularity in the ground;
Fig. 5 is a top plan view on the line 5—5 of Fig. 3;
Fig. 6 is a top plan view on the line 6—6 of Fig. 1; and
Fig. 7 is a side elevation on lines 7—7 of Fig. 3 with the bushing and upper and lower plates removed.

Fuselage 1 has rigidly attached to it at 2 and 3, two downwardly projecting struts 4, 5 preferably made of heavy spring steel. In place of struts 4, 5 there may be substituted any other comparable member which projects from the fuselage towards the ground and is adapted to support the weight of the airplane.

Two tandem wheel supporting frames, one of which is generally indicated at 6, are mounted at the lower end of struts 4, 5. These supporting means are identical and therefore only one of them will be described.

Tandem wheel supporting frame 6 is pivotally connected to strut 4 by means of a short fixed shaft 7 extending transversely through the center portion of the wheel supporting frame. Shaft 7 is rigidly fastened to strut 4 by four bolts extending from the inside end of the shaft which are fastened by nuts 8 to an angularly bent flattened end 9 of strut 4. A bushing 10 surrounds the shaft and permits articulation of the frame about the shaft. Frame 6 is made up of two U-shaped members 11 and 12 which are connected back to back with their open ends facing away from each other by upper and lower plates 13, 14. Shaft 7 and bushing 10 are fixed in the space between plates 13, 14. End plates 15, 16 are fastened to the free ends of U-member 11 and have connected therebetween an axle 17 on which is mounted a wheel drum 18 for supporting front tire 19. Rear tire 20 is similarly supported behind tire 19 in tandem relationship therewith. A brake 21 having a hydraulic or air coupling 22 may be conveniently connected to the rear wheel.

The lower flattened end of an upstanding rod 23 is fastened between shaft 7 and end 9 of strut 4, as best seen in Fig. 7. The upper end of rod 23 (Fig. 1) has connected thereto, substantially at right angles, another rod 24 which is rigidly fastened by a clamp 24' to the strut as best seen in Fig. 6. There is also fastened to the upper end of rod 23 a plate 25 (Fig. 3) having a pair of links 26, 27 connected thereto. End plate 15 has a similar link 28 connected to it. An elastic band 29 joins links 26 and 28. As best seen in Fig. 5, band 29 runs around a roller 30 while the other end 31 of the link may be pivotally connected to plate 15. Another similar elastic band 32 connects link 27 and link 33 fastened to plate 34 of the rear wheel. Bands 29 and 32 may be made of any suitably strong elastic material as, for example, a rubber core with some tough external sheathing. Bands 29 and 32 are of similar size and tension, and tend to keep the wheels in a level horizontal position, as seen in Fig. 3, and when frame 6 is articulated, as seen in Fig. 4, the movement is against the tension induced in the bands.

As best seen in Fig. 4 when the airplane has to go over rough ground, the undercarriage can adapt itself thereto and, even though only one wheel on each side of the plane is touching the ground, it will be well supported.

Stops 36, 37 project from the inside edges of U-shaped members 11 and 12 and are adapted to arrest the rotation or movement of frame 6 about shaft 7. Stop 36 is set to engage strut 4 at a point just before continued upward rotation of the frame 6 would cause damage to the propeller of the plane by forcing it too close to the ground, or the plane would nose over. Stop 37 is set so that it will engage strut 4 at a point just before which, if frame 6 were permitted to continue rotating downwardly, the tail assembly would strike the ground.

It will be seen from the foregoing that the present invention provides an undercarriage for an airplane which will combine the advantages of skids and wheels, and yet one which is rugged, simple, inexpensive and readily adaptable to the fuselage of the customary airplane. There are no moving parts requiring close tolerances and close fits which could get out of order when subjected to the shocks and heavy use to which such construction is frequently subject.

I claim:

1. An undercarriage for an airplane fuselage, comprising a pair of struts diverging obliquely downwardly, an elongated stiff wheel supporting frame member having a pivotal mounting intermediate its ends, one frame member being joined by said mounting to the lower end of each of said struts, wheels journaled at each end of each frame member upon parallel axes to constitute tandem wheels upon each of said frame members, flexible and elastic means joining the ends of each of said frame members and its associated strut, and a pair of stop means mounted upon each side of the pivotal mounting for each frame member, each stop means extending obliquely upwardly from said frame member for abutting with the strut associated with said frame member to limit the pivoting of the frame member with respect to its associated strut.

2. The device according to claim 1 and in which the frame member for holding two wheels in tandem comprise a pair of U-shaped members rigidly fastened back to back with their open ends facing away from each other.

3. The device according to claim 1 and an upstanding member rigidly connected at its lower end to said pivotal connection and at the upper end to said flexible and elastic means.

4. The device according to claim 3 and spaced links fastened to said upstanding member at its upper end and to the frame members, respectively, said flexible and elastic means joining said links.

5. An undercarriage for an airplane fuselage comprising a pair of struts projecting downwardly therefrom, an elongated tandem wheel supporting frame for each strut having a pair of aligned wheels journaled on the ends of each frame, a fixed shaft extending from the strut laterally of the tandem wheel supporting frame intermediate the ends of the latter, a bushing in said supporting frame journaling the shaft whereby said frame may rock with respect to the strut, a first rod fastened between the strut and shaft and rigidly upstanding therefrom, a second rod substantially at right angles to the first rod and connected between the first rod and the strut, a plate connected to the upper end of said first rod, first links connected to said plate, second links connected to said wheel supporting frame near the ends thereof, a pair of elastic bands connected between said first and second links, and stops projecting from said wheel supporting frame for engaging the strut to limit the rocking of the frame about the fixed shaft.

References Cited in the file of this patent

UNITED STATES PATENTS

| | | |
|---|---|---|
| 1,325,230 | Caproni | Dec. 16, 1919 |
| 1,633,174 | Fritsch | June 21, 1927 |
| 1,668,122 | Mummert | May 1, 1928 |
| 1,802,692 | Zindel | Apr. 28, 1931 |
| 1,852,230 | Breguet | Apr. 5, 1932 |
| 2,130,914 | Warren | Sept. 20, 1938 |
| 2,163,653 | Wittman | June 27, 1939 |
| 2,386,620 | Loyd | Oct. 9, 1945 |

OTHER REFERENCES

Super Cub "Aviation Operations," July 1950, page 63.